(12) United States Patent
Kono

(10) Patent No.: US 9,442,568 B2
(45) Date of Patent: Sep. 13, 2016

(54) INPUT APPARATUS

(75) Inventor: Kenji Kono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 306 days.

(21) Appl. No.: 13/392,870

(22) PCT Filed: Aug. 5, 2010

(86) PCT No.: PCT/JP2010/004941
§ 371 (c)(1),
(2), (4) Date: Feb. 27, 2012

(87) PCT Pub. No.: WO2011/024389
PCT Pub. Date: Mar. 3, 2011

(65) Prior Publication Data
US 2012/0154328 A1 Jun. 21, 2012

(30) Foreign Application Priority Data
Aug. 27, 2009 (JP) .................. 2009-197347

(51) Int. Cl.
*G06F 3/045* (2006.01)
*G06F 3/041* (2006.01)
*G06F 3/042* (2006.01)
*G06F 3/043* (2006.01)
(Continued)

(52) U.S. Cl.
CPC ............. *G06F 3/016* (2013.01); *G06F 3/0414* (2013.01); *G06F 3/04855* (2013.01); *G06F 2203/04105* (2013.01)

(58) Field of Classification Search
CPC ............... G06F 3/0488; G06F 3/0482; G06F 3/04842; G06F 3/04847
See application file for complete search history.

(56) References Cited

U.S. PATENT DOCUMENTS

| 6,118,435 A | 9/2000 | Fujita et al. |
| 7,292,227 B2 | 11/2007 | Fukumoto et al. |
| 2007/0132740 A1 * | 6/2007 | Meiby .......................... 345/173 |

FOREIGN PATENT DOCUMENTS

| JP | 10-293644 A | 11/1998 |
| JP | H10-293644 A | 11/1998 |
| JP | 11212725 A * | 8/1999 ............. G06F 3/033 |

(Continued)

OTHER PUBLICATIONS

Japanese Office Action "Notice of Reasons for Refusal" dated Feb. 9, 2010; Japanese Patent Application No. 2009-197347; with translation.

Japanese Office Action "Official Decision of Refusal" dated Jun. 22, 2010; Japanese Patent Application No. 2009-197347; with translation.

Japanese Office Action "Interrogation" dated Jul. 26, 2011; Japanese Patent Application No. 2009-197347; Appeal No. 2010-21379; with translation.

(Continued)

*Primary Examiner* — Alexander Eisen
*Assistant Examiner* — Nan-Ying Yang
(74) *Attorney, Agent, or Firm* — Studebaker & Brackett PC

(57) ABSTRACT

Provided is an input apparatus having a touch sensor to detect a contact operation to a slide bar displayed and to provide a tactile sensation of shift of the slide bar.

An input apparatus 1 has a touch sensor 11 configured to detect a contact, a load detection unit 12 configured to detect a pressure load on a touch face of the touch sensor 11, a display unit 14 configured to display the slide bar, a tactile sensation providing unit 13 configured to vibrate the touch face, and a control unit 15 configured to control the tactile sensation providing unit 13 such that a tactile sensation is provided to an object pressing the touch face based on a position of a knob of the slide bar shifted in response to the contact detected by the touch sensor 11 while the pressure load detected by the load detection unit 12 satisfies a predetermined standard.

2 Claims, 9 Drawing Sheets

(51) Int. Cl.
*G06F 3/01* (2006.01)
*G06F 3/0485* (2013.01)

(56) References Cited

FOREIGN PATENT DOCUMENTS

| JP | H11-212725 A | 8/1999 |
|---|---|---|
| JP | 2002-149312 A | 5/2002 |
| JP | 2004-280590 A | 10/2004 |
| JP | 2005-332063 A | 12/2005 |
| JP | 2006-79238 A | 3/2006 |
| JP | 2006-079238 A | 3/2006 |

OTHER PUBLICATIONS

Japanese Office Action "Trial Decision" dated Jan. 10, 2012; Japanese Patent Application No. 2009-197347; Appeal No. 2010-21379; with translation.

An Office Action "Decision of Refusal" dated Aug. 27, 2013, which corresponds to Japanese Patent Application No. 2010-191412 and is related to U.S. Appl. No. 13/392,870 with Concise Explanation.

International Search Report; PCT/JP2010/004941; Nov. 9, 2010.

The Japanese Office Action "Notification of Reason for Refusal" dated Feb. 5, 2013, which corresponds to Japanese Patent Application No. 2010-191412, and is related to U.S. Appl. No. 13/392,870 with translation.

\* cited by examiner

FIG. 2
(a)
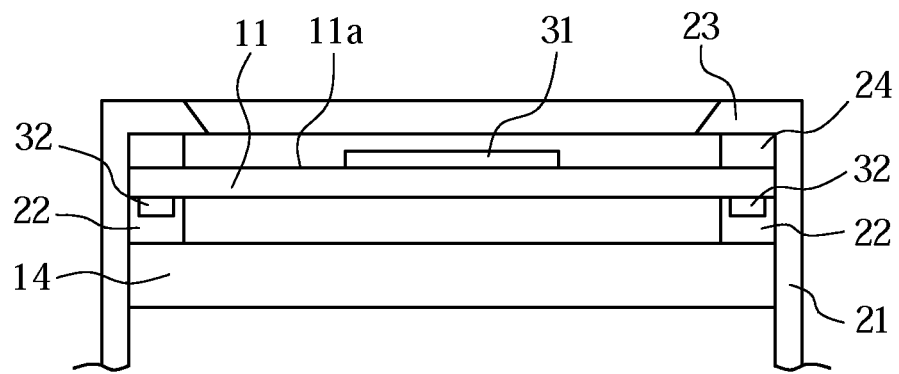
(b)
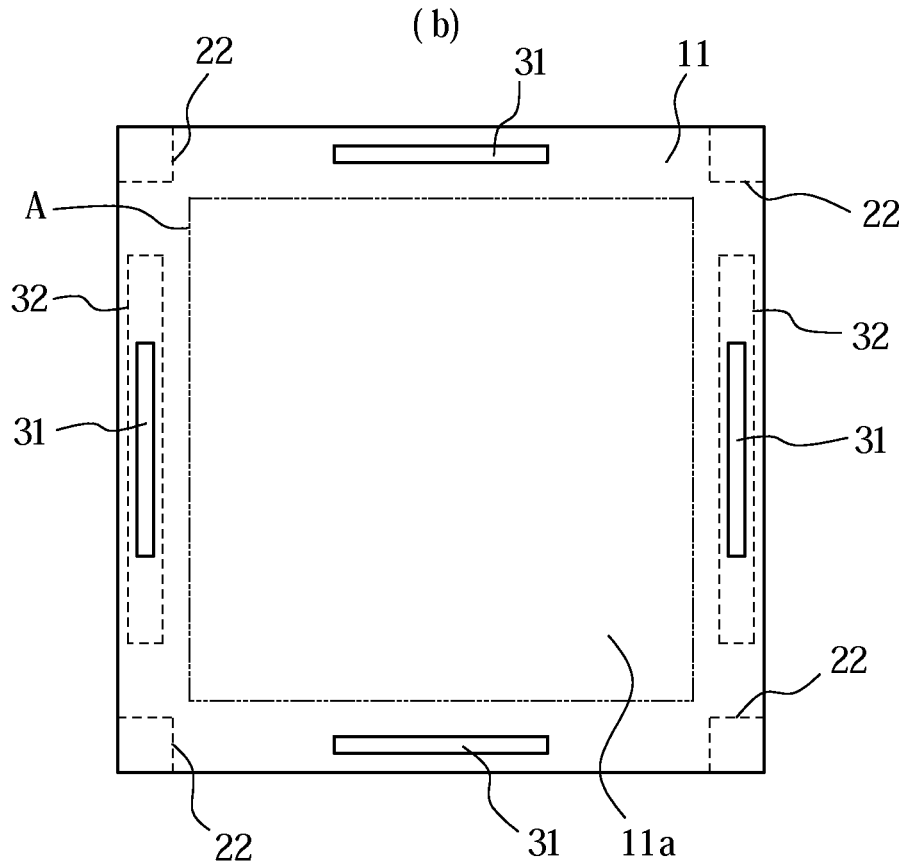

FIG. 9
(A)
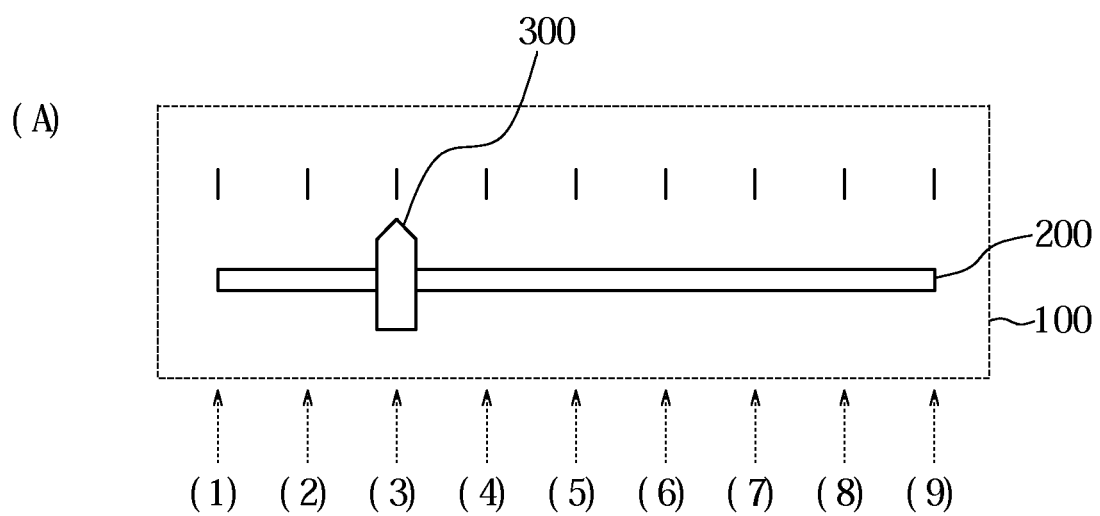
(B)
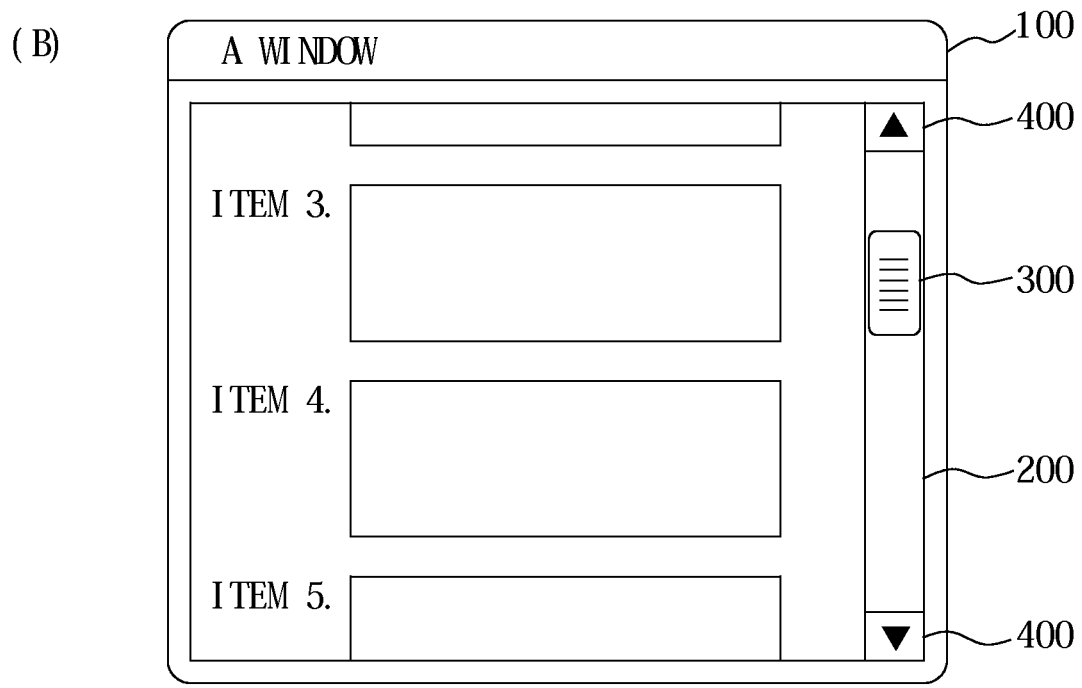

INPUT APPARATUS

CROSS REFERENCE TO RELATED APPLICATION

This application claims priority to and the benefit of Japanese Patent Application No. 2009-197347 filed on Aug. 27, 2009, the entire contents of which are incorporated herein by reference.

TECHNICAL FIELD

The present invention relates to an input apparatus having a touch sensor.

BACKGROUND ART

In recent years, there are mobile terminals such as mobile phones that employ the input apparatus having touch sensors, such as touch panels, touch switches and the like, as the input apparatus such as operation units, switches and the like to receive contact operations by users. Such input apparatus having touch sensors are popularly employed not only by the mobile terminals but also by information equipments such as calculators, ticket vending machines, home electric appliances such as microwaves, TV sets and lighting equipment, industrial equipment (FA equipment) and the like.

There are a variety of known types of those touch sensors, such as a resistive film type, a capacitive type, an optical type and the like. However, touch sensors of any of these types receive a touch input by a finger or a stylus pen and, unlike a mechanical push-button switch, touch sensors themselves are not physically depressed when touched.

Incidentally, the input apparatus of late years often use a variety of graphical user interface (Graphical User Interface, hereinafter referred to as "GUI") as user interface (hereinafter, referred to as "UI"). Such a trend is widely seen not only in the input apparatus using the touch sensors set forth above but also in personal computers (PCs), for example, to be operated by input devices such as keyboards, mice and the like. In order to perform an input to the input apparatus having GUI implemented therein by using input device, an operator clicks (single click and double click), drags or slides an icon and the like displayed on a display unit (screen).

There are a variety of objects such as the icons used for GUI. Especially, there are objects to prompt the contact operation which are, for example, in shape of graphically depicted keys and buttons on the screen to detect the contact operation and the like to the object by the operator. In addition, there also are numerous objects imitating actual devices such as, for example, slide controllers used for volume control. Adopting such objects can make operations required to the operator exceedingly intuitive and clear. In operating the PC, the operator can carry out operations to the objects of GUI set forth above by using the input device such as the mouse.

FIG. 9 illustrates slide bars used by the operator when operating with the input device such as the mouse in a conventional GUI environment.

An object 100 illustrated in FIG. 9(A) is an input object including a slide bar 200 used to change a variable value for such as, for example, volume control. The operator can change a predetermined variable value using the slide bar 200 between, for example, a minimum value at a left end and a maximum value at a right end. A knob 300 on the slide bar 200 indicates a current variable value. The operator can adjust the predetermined variable value by shifting the knob 300 with the input device such as the mouse.

There are some slide bars that, although allowing the operator to freely shift the knob 300, stops the knob 300 only at predetermined positions such as, for example, positions numbered (1)-(9) illustrated under the object 100 in FIG. 9(A). That is, when the operator shifts the knob 300 on such a slide bar, the display displays a smooth movement of the knob 300 in accordance with the shift. However, when the operator finishes an input to shift the knob 300 and releases the knob 300, the knob 300 is displayed to be stopping at a closest position among the predetermined positions numbered (1)-(9) illustrated under the object 100 in FIG. 9(A). Such a slide bar is used to change the predetermined valuable value not by a substantial amount in an analogue method but by levels in a digital method. The slide bar behaving in this manner is particularly referred to as a "track bar" in the present application.

An object 100 illustrated in FIG. 9(B) is an object of a window illustrating a web page of the Internet, for example.

The window of the object 100 illustrated in FIG. 9(B) has a slide bar 200 on a right side thereof. As illustrated in FIG. 9(B), a window A illustrated by the object 100 is displaying contents including a plurality of items but not able to display all of the contents due to its current size. Therefore, the window A of the object 100 inevitably displays a part of the contents.

In this case, in order to display an undisplayed part in the window A, the operator shifts a knob 300 of the slide bar 200 on the right side, thereby the operator can scroll through the contents displayed in the window A in accordance with a position of the knob 300. For example, in order to display Item 1 and a part of Item 2, which are not displayed in the window A illustrated in FIG. 9(B), the operator shifts the knob 300 of the slide bar 200 upward. Similarly, in order to display an entire Item 5, a part of which is displayed in the window A in FIG. 9(B), the operator shifts the knob 300 of the slide bar 200 downward.

As described above, the operator can scroll up to a top of the contents by shifting the knob 300 to an upper end and scroll down to a bottom of the contents by shifting the knob 300 to a lower end. In addition, the slide bar 200 is also provided with an arrow 400 at each of the upper end and the lower end thereof. These arrows allow the operator to scroll the contents by a predetermined amount such as, for example, one line at a time, in response to a click operation to them by the operator.

Such a slide bar allows the operator to minutely shift the knob 300 such that the contents are minutely moved by, for example, one line. The slide bar allows to display a part of the contents and to scroll through the contents, even when the contents include a large amount (for example, items) to be displayed. The slide bar behaving in this manner is particularly referred to as a "scroll bar" in the present application. That is, in the present application the "slide bar" includes both of the "track bar" and the "scroll bar" described above.

Some of the track bars and the scroll bars described above allow the operator to shift the knob 300, and to click at a position of the slide bar 200 where the knob 300 is not positioned, as well. As such, by clicking a position without the knob 300 on the slide bar 20 in this manner, the operator can gradually shift the knob 300 to the clicked position. Moreover, there also are the track bars and the scroll bars that can act as described above in response to continuous click, that is, a so-called "holding down", which is an operation to hold clicking.

Each of the slide bars described above can provide excellent operability to the operator according to types of the contents and application software used in the input apparatus. Therefore, these slide bars are popularly used as GUI not only for the input devices such as the keyboard and the mouse to operate the PC but also for the input apparatus of various terminals including the mobile phones. In contact operation of the slide bars described above by using the input device other than the keyboard and the mouse, the operator can use a direction key and the like of the mobile phone, for example.

When the input apparatus having the touch sensors set forth above adopt the track bar and the scroll bar described above, the input apparatus can provide the operator with the required operations more clearly and intuitively than operations of the PCs using the input device such as the key board and the mouse. In this case, the input apparatus can detect a contact to the touch sensor corresponding to a position of the slide bar and the knob displayed on the display unit, that is, an operation to directly touch or slide by an operator's fingertip. Thereby, the operator can operate with the fingertip just like actually sliding a knob of a mechanical slide controller. In addition, since such an input apparatus relates a slide amount of the operator's finger to that of the knob (displayed), it can respond to the contact operation of the operator more accurately than the input devices such as the keyboard and the mouse.

As such, when detecting an operation to the slide bar such as the track bar and the scroll bar as described above, the input apparatus having the touch sensor cannot accurately respond to the contact operation by the operator on the shift if the contact detected by the touch sensor is not accurate. Accordingly, there is suggested a technique, by using a statistical method, to correct the position of the contact detected by the touch sensor (for example, see Patent Document 1).

RELATED ART DOCUMENT

Patent Document

Patent Document 1: Japanese Patent Laid-Open No. 2004-280590

SUMMARY OF INVENTION

Technical Problem

According to the technique disclosed in the Patent Document 1 set forth above, it is possible to calculate a correction value by the statistical method based on a plurality of contact coordinate values and information on a plurality of contact areas. It is thus possible to correct more accurately than correcting at each time of detection of the user's contact, thereby improving operability in operation by the operator.

More specifically, the object such as the scroll bar, for example, has contact coordinates dispersed in a scrolling direction thereof (for example, a longitudinal direction in FIG. 9(B)) in a displayed coordinate system, due to its characteristic shape. Presumably, since the contact positions detected on the scroll bar vary based on conditions for the operators to contact, the contact positions in the longitudinal direction in FIG. 9(B), namely, in the scrolling direction on the scroll bar 200, vary among operators.

In contact operation to the scroll bar illustrated in FIG. 9(B), it is necessary for the operator to operate relatively accurately in a lateral direction, that is, in a direction perpendicular to the scrolling direction of the scroll bar. According to the technique disclosed in the Patent Document 1 set forth above, therefore, the contact coordinates obtained are recorded as a coordinate history and used to update correction information. For example, if there is a tendency that the contact positions are unevenly distributed on a right side of the scroll bar 200 due to the operator's habit and the like in operation, the correction value is updated by using horizontal axis components on the displayed coordinate system in the coordinate history of the contacts. Therefore, the technique disclosed in the Patent Document 1 set forth above can correct more accurately in consideration of the operator's habit and the like in operation and improve operability.

However, even when using the technique disclosed in the Patent Document 1 set forth above, the operator can know the position of the knob being operated on the slide bar by a visually or aurally appealing means. When the operator can operate carefully watching the operator's fingertip and the display on the display unit, it is easy for the operator to recognize a state of a contact operation and a shift amount of a slide operation by visually confirming the position of the knob displayed. However, in using the input apparatus implemented in the mobile terminal represented by, for example, the mobile phone, it is often the case that the operator carries out the contact operation while walking or doing something else. In addition, especially small terminals such as the mobile phones have a trend to display multiple small input objects on the touch sensor in a limited size. Therefore, when the input object displayed on the display unit is small, the operator may not be able to confirm the display position of the knob being shifted, when the operator carries out the contact operation with the finger, as a view of the input object is blocked by the finger.

In such a case, the operator cannot operate confirming whether the slide bar is actually shifting in response to the contact operation by the operator and the shift amount of the knob on the slide bar. Being unable to visually confirm an operation state as described above, the operator may possibly hesitate to carry out the operation or cause an extra operation to redo the operation out of a sense of unease being unable to know whether the contact operation is correctly detected by the input apparatus.

As such, it may be considered to generate a sound to inform the operator of that the slide operation to the slide bar is correctly detected and confirmed by the input apparatus. If the input apparatus generates a sound in accordance with the shift of the slide bar, the operator can aurally confirm the state of the contact operation. However, such auditory feedback may be difficult to be confirmed in a noisy environment and is not applicable when the equipment being used is in a silent mode. In some public places, moreover, it is inappropriate to use the input apparatus which make a sound.

When detecting the contact operation shifting the knob of the slide bar by the touch input to the touch sensor, conventional input apparatus generally use a visually or aurally appealing method to inform the operator of the state of the contact operation. However, if there is a method capable of informing about a detection state of the contact operation by providing a characteristic feedback by other than appealing visually or aurally, operator can recognize the state of the contact operation more accurately and have a sense of reassurance.

Accordingly, an object of the present invention in consideration of such conditions is to provide an input apparatus capable of detecting the contact operation to the slide bar displayed by using the touch sensor and providing a tactile sensation indicating a moving state of the knob on the slide bar.

Solution to Problem

In order to achieve the above object, an input apparatus according to a first aspect of the present invention includes:
a touch sensor configured to detect a contact;
a load detection unit configured to detect a pressure load on a touch face of the touch sensor;
a display unit configured to display a slide bar;
a tactile sensation providing unit configured to vibrate the touch face; and
a control unit configured to control the tactile sensation providing unit based on a position of a knob of the slide bar shifted in response to the contact detected by the touch sensor, while the pressure load detected by the load detection unit satisfies a predetermined standard, such that a tactile sensation is provided to an object pressing the touch face.

A second aspect of the present invention relates to the input apparatus according to the first aspect, wherein the control unit controls the tactile sensation providing unit such that the tactile sensation is provided to the object pressing the touch face each time the knob of the slide bar is shifted by a predetermined amount.

A third aspect of the present invention relates to the input apparatus according to the first aspect, wherein the control unit controls the tactile sensation providing unit such that a different tactile sensation is provided to the object pressing the touch face based on a shift amount of the knob of the slide bar.

A fourth aspect of the present invention relates to the input apparatus according to the first aspect, wherein the control unit controls the tactile such that a different tactile sensation is provided to the object pressing the touch face based on a position on the slide bar to which the knob is shifted.

Effect of the Invention

According to the present invention, the tactile sensation is provided to the object pressing the touch face based on a position of the knob of the slide bar shifted based on position information from the touch sensor while the load detection unit detects the pressure load satisfying the predetermined standard. Therefore, the input apparatus according to the present invention informs an operator of a state of a contact operation detected, by providing characteristic tactile sensations appealing to a tactile sense. Hence, the input apparatus according to the present invention can improve operability further and also promise an effect to indirectly reduce erroneous operations.

BRIEF DESCRIPTION OF DRAWINGS

FIG. 2 illustrates an exemplary housing structure of the input apparatus according to the first embodiment;
FIG. 9 illustrates exemplary displays of objects of conventional slide bars.

DESCRIPTION OF EMBODIMENTS

Embodiments of the present invention will be described with reference to the accompanying drawings. An input apparatus according to the present embodiment is widely applicable to any input apparatus implemented in, for example, mobile terminals such as mobile phones and vehicle navigation systems, as well as industrial equipment, sound equipment such as audio equipment, electronic instruments, home electric appliances, game machines, ticket vending machines and the like.

First Embodiment

Figure 1:
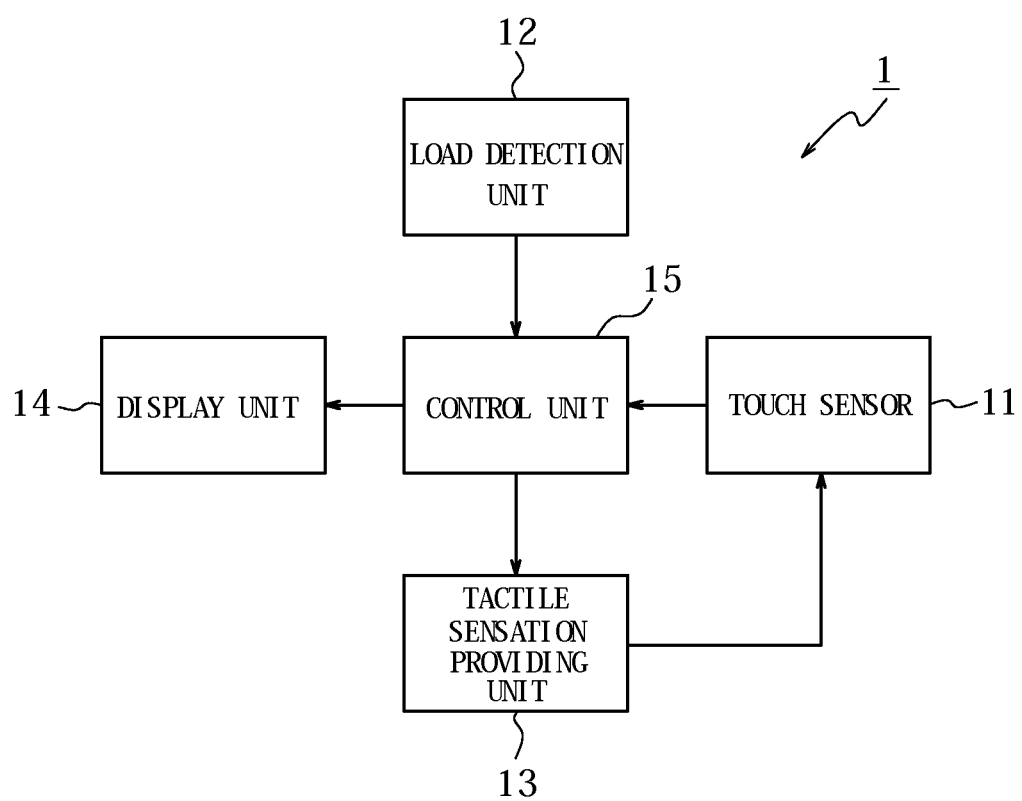
FIG. 1 is a block diagram illustrating a schematic constitution of an input apparatus according to a first embodiment of the present invention.

FIG. 1 is a block diagram illustrating a schematic constitution of the input apparatus according to a first embodiment of the present invention.

As illustrated in FIG. 1, an input apparatus 1 according to the first embodiment has a touch sensor 11, a load detection unit 12, a tactile sensation providing unit 13, a display unit 14, and a control unit 15 configured to control overall operations.

The touch sensor 11 is disposed on a front face of the display unit 14 to detect a pressing input (contact) to a key and a button (hereinafter, referred to simply as a "key and the like") displayed on the display unit 14 by an operator's finger or the like on a corresponding touch face of the touch sensor 11. The touch sensor 11 may be, for example, of a known type such as a resistive film type, a capacitive type, an optical type or the like. The load detection unit 12 detects a pressure load on the touch face of the touch sensor 11 and may include an element such as, for example, a strain gauge sensor, a piezoelectric element or the like, which linearly reacts to the load. The tactile sensation providing unit 13 vibrates the touch sensor 11 and may include, for example, a piezoelectric vibrator. The display unit 14 displays various objects including input objects and may include, for example, a liquid crystal display panel, an organic EL display panel or the like. According to the present embodiment, the display unit 14 displays a graphical image of a predetermined slide bar as the input object based on application software, for example. The slide bar displayed on the display unit 14 may take any form including a track bar and a scroll bar described above.

FIG. 2 illustrates an exemplary housing structure of the input apparatus 1 illustrated in FIG. 1; FIG. 2(a) is a cross-sectional view of a main section, and FIG. 2(b) is a plane view of the main section. The display unit 14 is contained in a housing 21. The touch sensor 11 is disposed on the display unit 14 via insulators 22 made of elastic members. In the input apparatus 1 according to the present embodiment, the display unit 14 and the touch sensor 11 are rectangular in shape in a planar view. Also, according to the present embodiment, the touch sensor 11 is held on the display unit 14 via the insulators 22 arranged at four corners outside a display area A of the display unit 14 illustrated by a chain double-dashed line in FIG. 2(*b*).

The housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIG. 2 may have, for example, a surface member having a touch face 11*a* and constituted by a transparent film or the glass, and a rear face member constituted with the glass or acryl. The touch sensor 11 is designed such that, when the touch face 11*a* is pressed down, a pushed part is bent (strained) slightly in accordance with the pressing force or a structure itself is bent slightly.

A strain gauge sensor 31 to detect a load (pressuring force) applied on the touch sensor 11 is provided, adhered or the like, on a surface of the touch sensor 11 at a position close to each periphery covered by the upper cover 23. In addition, a piezoelectric vibrator 32 to vibrate the touch sensor 11 is provided, adhered or the like, on the rear face of the touch sensor 11 at a position close to a periphery on each of two opposing sides. That is, the input apparatus illustrated in FIG. 2 has the load detection unit 12 illustrated in FIG. 1 including four strain gauge sensors 31 and the tactile sensation providing unit 13 including two piezoelectric vibrators 32. In addition, the tactile sensation providing unit 13 vibrates the touch sensor 11 such that the touch face 11*a* is vibrated. It is to be noted that the housing 21, the upper cover 23 and the insulator 24 illustrated in FIG. 2(*a*) are omitted in FIG. 2(*b*).

Figure 3:
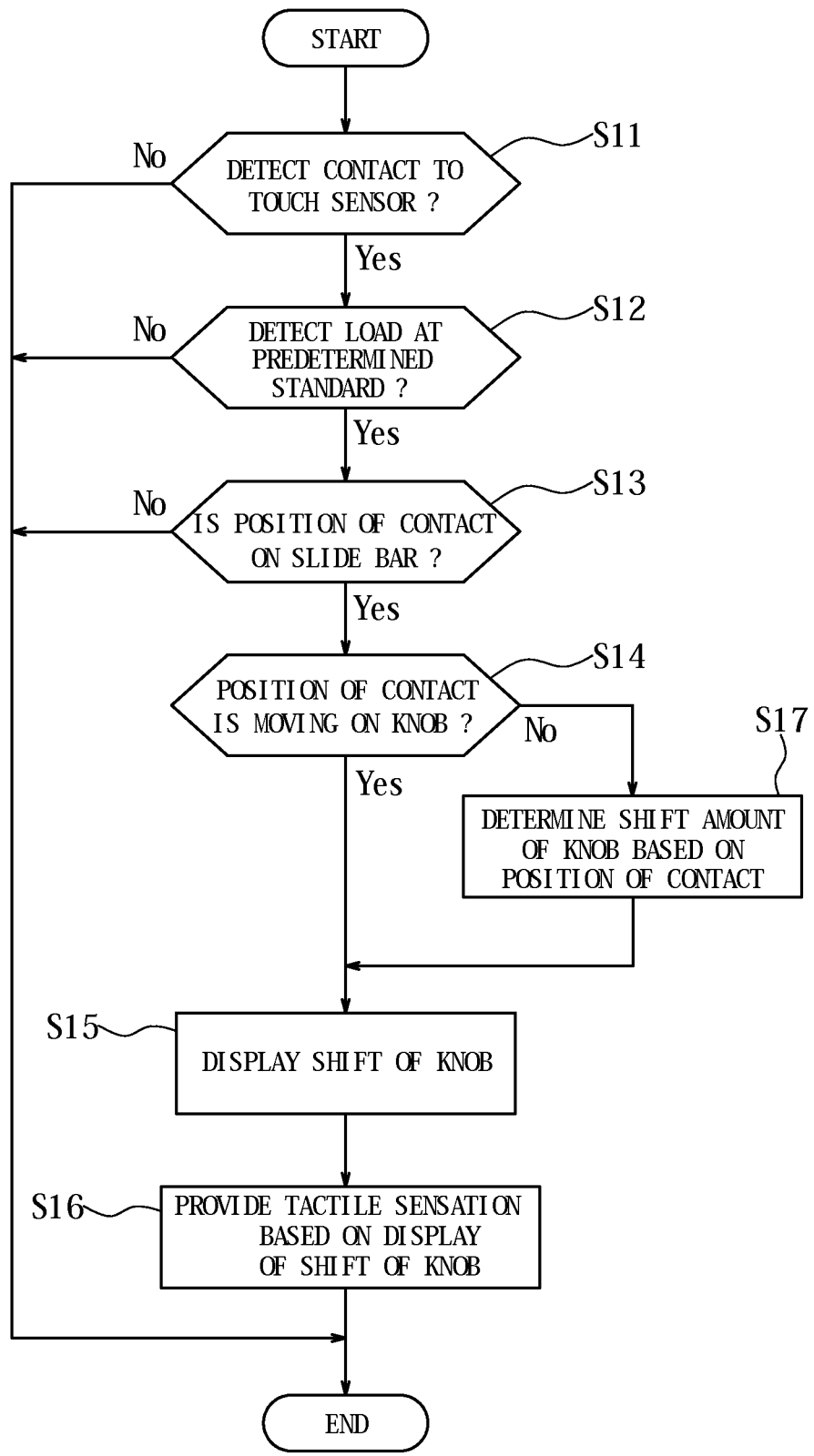
FIG. 3 is a flowchart of an operation by the input apparatus according to the first embodiment.

FIG. 3 is a flowchart of an operation of the input apparatus 1 according to the first embodiment. The input apparatus 1 according to the present embodiment provides a tactile sensation corresponding to a shift of the knob mainly when a position of a contact detected by the touch sensor 11 shifts on the knob of the slide bar while the pressure load satisfies a predetermined standard. It is to be noted that the knob is one of a plurality of elements constituting the slide bar. The knob serves as an indicator of a display position or a proportion to the whole. An operator can change the display position and the proportion to the whole by grabbing (holding) and shifting (dragging) the knob. The "knob" itself may also be referred to as a "bar".

In order to start the operation illustrated in the flowchart of FIG. 3, the input object of the slide bar is displayed on the display unit 14 of the input apparatus 1 prior to the contact by the operator to the touch face of the touch sensor 11 is detected. An example of a display of the slide bar will be described below.

When the operation of the input apparatus 1 according to the present embodiment starts, the control unit 15 monitors the contact to the touch sensor 11 and the load detected by the load detection unit 12. When the touch sensor 11 detects the contact by a pressing object (pressing means) such as the operator's finger, a stylus pen or the like at step S11, the control unit 15 proceeds to step S12.

At step S12, the control unit 15 determines whether the pressure load detected by the load detection unit 12 increases in proportion to a pressure on the touch sensor 11 and satisfies the predetermined standard. The load detection unit 12 detects the load from, for example, an average output value of the four strain gauge sensors 31. Here, it is preferable that, based on the pressure loads in usual pressing operations by the operator, the load satisfying the predetermined standard is preset to be, for example, 1 N (Newton) and resettable thereafter. In addition, setting the predetermined standard too low is to be avoided, in consideration of the pressure loads of the pressing input intended by the operator (for example, an average value of the pressure loads), in order to avoid receiving an unintentional light contact to the touch sensor 11 by the operator as a contact operation, and also to provide the operator with a pressure sensation for a realistic tactile sensation described below. Even when the touch sensor 11 detects the contact at step S11, the input apparatus 1 does not perform the operation according to the present embodiment if the pressure load detection unit 12 does not satisfy the predetermined standard at step S12.

When the pressure load satisfying the predetermined standard is detected at step S12, the control unit 15 determines whether the position of the contact detected by the touch sensor 11 corresponds to a position of the slide bar displayed on the display unit 14 (step S13). Even when the load satisfying the predetermined standard is detected at step S12, the input apparatus 1 does not perform the operation according to the present embodiment if the position of the contact does not correspond to the position of the slide bar at step S13.

When the position of the contact detected corresponds to the position of the slide bar at step S13, the control unit 15 determines whether the position of the contact is on the knob and, whether movement of the position of the contact is detected (step S14). When it is detected at step S14 that the position of the contact is on the knob and moved, the control unit 15, based on a new position of the contact (destination position), shifts the knob displayed on the display unit 14 to the new position of the contact and displays it (step S15).

At the step S15, the shift of the knob is displayed by, for example, animation picture depicting actual movement of a mechanical knob. At this time, it is preferable to display the shift of the knob in synchronization with the movement of the position of the contact by the operator. In displaying the shift of the knob, in addition, it is possible to display a display state in order to emphasize that the contact by the operator is detected and the knob is shifted by temporarily altering color and brightness of the knob object.

When displaying the knob at the new position of the contact after the shift at step S15, the control unit 15 provides the tactile sensation corresponding to the new position of the knob (step S16). Here, the control unit 15 drives the tactile sensation providing unit 13 with a predetermined drive signal such that the touch face of the touch sensor 11 is vibrated in a predetermined vibration pattern and provides the tactile sensation. The tactile sensation providing unit 13 drives, for example, two piezoelectric vibrators 32 in phase.

Here, that is, while the load detection unit 12 detects the pressure load satisfying the predetermined standard, the control unit 15 controls the tactile sensation providing unit 13 based on the position of the knob of the slide bar shifted in response to the contact detected by the touch sensor 11. At this time, the control unit 15 controls the tactile sensation providing unit 13 such that the tactile sensation is provided to the pressing object pressing the touch face of the touch sensor 11.

The tactile sensation provided to the pressing object by the tactile sensation providing unit 13 at step S16 is a "click sensation", which is a sensation obtained when clicking mechanical keys and buttons, for example.

In order to provide such a realistic click sensation to the operator, the input apparatus 1 stimulus a tactile sense of the operator while stimulating a pressure sense, by the following operation. For example, the input apparatus 1 stimulates the pressure sense until the pressure load on the touch sensor 11 satisfies the standard to provide the tactile sensation (for example, 1 N) and, when the pressure load satisfies the standard, stimulates the tactile sense by driving the piezoelectric element 32 with the predetermined drive signal such that the touch face 11a is vibrated. Thereby, the input apparatus 1 can provide the operator with the click sensation similar to that obtained when pressing a button switch such as a push-button switch (push-type button switch). Accordingly, even with the push-button switch graphically depicted on the touch sensor, the operator can carry out the contact operation feeling the realistic click sensation similar to that obtained when operating the actual push-button switch. Therefore, the operator would not have a feeling of strangeness. Moreover, since the operator can carry out the input operation in conjunction with perception to "have tapped" the touch sensor 11, erroneous inputs caused by mere light contacts are prevented.

The drive signal to provide the click sensation described above, that is, a certain frequency, a period (wavelength), a waveform and a vibration amplitude to stimulate the tactile sense may be set suitably based on the click sensation to provide. For example, in order to provide the click sensation represented by a metal dome switch employed by the mobile terminal, the tactile sensation providing unit 13 is driven by the drive signal of, for example, a sine wave with a frequency of 170 Hz, for 1 period. The tactile sensation providing unit 13 is driven by such a drive signal such that a touch face 11a is vibrated by approximately 15 μm under a standard pressure load Pth. Thereby, it is possible to provide the operator with the realistic click sensation similar to that obtained when pressing down an actual key.

Alternatively, the tactile sensation provided to the pressing object by the tactile sensation providing unit 13 at step S16 may be varied in addition to the "click sensation" described above, by tuning each parameter set forth above. For example, it is possible to provide a "flip sensation" to the pressing object (pressing means such as, for example, a user's finger) performing the contact operation to the touch sensor 11. The "flip sensation" is a tactile sensation giving a feeling as if the touch face is slightly protruded for a moment.

After providing the tactile sensation at step S16, the control unit 15 performs a predetermined operation based on the application software and then ends the operation according to the present embodiment. Here, the predetermined operation based on the application software is, for example, an operation to scroll contents displayed on the display unit 14 in accordance with the shift of the knob of the scroll bar. Since such a predetermined operation based on the application software is the same as those according to conventional arts, a detailed description thereof is omitted.

On the other hand, when the position of the contact is on the slide bar elsewhere than the knob at step S14, or when the position of the contact on the knob of the slide bar does not move and thus the knob is not shifted, the control unit 15 proceeds to step S17.

At step S17, the control unit 15 determines a shift amount of the knob based on the position of the contact on the slide bar elsewhere than the knob. As described above, some track bar and scroll bar can shift the knob when detecting a click operation to a position on the slide bar elsewhere than the knob. Following that, with the input apparatus 1 according to the present embodiment, the shift amount of the knob at the time when the click operation is detected at a position on the slide bar elsewhere than the knob is preset according to each position. Thereby, even when the contact is detected at a position on the slide bar elsewhere than the knob, it is possible to determine the shift amount of the knob based on the position of the contact and display the shift of the knob (step S15) as well as providing the tactile sensation based on the display of the shift of the knob (step S16).

If the position of the contact detected on the knob of the slide bar does not move and thus the knob is not shifted, the tactile sensation is not provided at step S16, in order to indicate that the knob is not shifted at step S15. In this case, that is, the input apparatus 1 does not provide the tactile sensation, as the knob is not shifted.

The following is a further detailed description of a characteristic operation according to the present embodiment.

As described above, at the step S16, when the knob of the slide bar is shifted while the pressure load satisfying the predetermined standard is detected, the control unit 15 controls the tactile sensation providing unit 13 to provide the tactile sensation in accordance with the shift. According to the present embodiment, here, the control unit 15 controls the tactile sensation providing unit 13 such that the tactile sensation is provided to the pressing object pressing the touch face of the touch sensor 11 each time the knob of the slide bar is shifted by a predetermined amount.

According to the present embodiment, that is, the predetermined amount is preliminarily defined as a standard shift amount of the knob to provide the tactile sensation in accordance with the shift of the knob. The tactile sensation is provided each time the knob is shifted by the predetermined amount.

Figure 4:
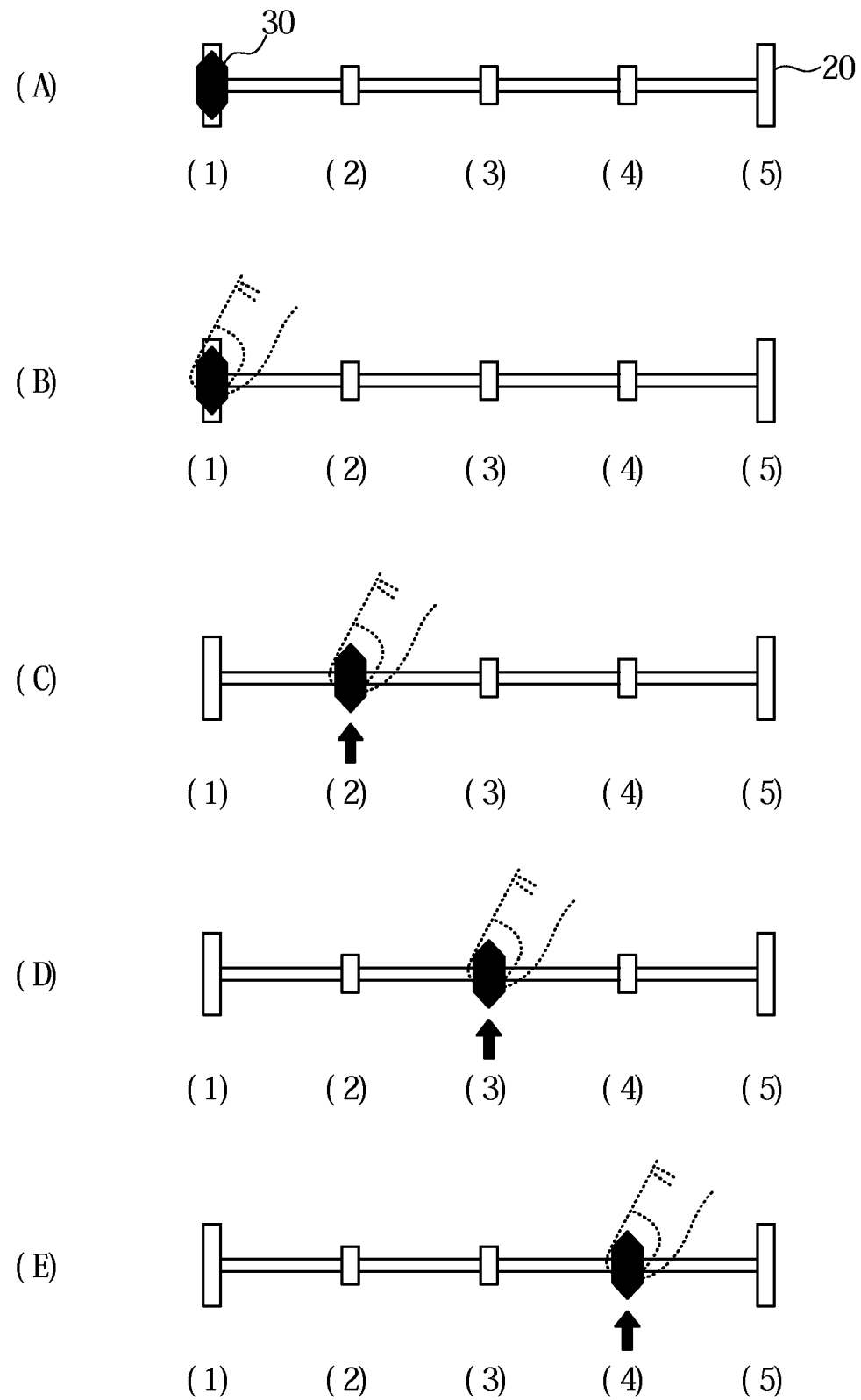
FIG. 4 schematically illustrates an example of a mode of the operation by the input apparatus according to the first embodiment.

FIG. 4 illustrates an example in which the input apparatus 1 according to the present embodiment employs the track bar. In FIG. 4(A), a knob 30 is displayed at the left end of the slide bar 20 as the track bar. Since the slide bar 20 is the track bar, the knob 30 stops only at positions (1)-(5) illustrated under the slide bar 20 after the operator shifts the knob 30. In addition, the predetermined amount as the standard shift amount of the knob to provide the tactile sensation described above is, for example, each interval between the positions (1)-(5) (for example, the interval between the positions (1)-(2)).

The following is a case that, with such setting, the contact to the knob 30 of the slide bar 20 by the operator is detected as illustrated in FIG. 4(B). As described with reference to step S12, the touch sensor 11 of the input apparatus 1 does not shift the knob 30 when a light pressure load failing to satisfy the predetermined standard. The input apparatus 1 according to the present embodiment, in order to provide the realistic tactile sensation, detects the pressure load satisfying the predetermined standard as an operation to shift the knob 30. In FIG. 4, the operator's finger is illustrated by a broken line for the sake of clarity. The same applies to the figures after FIG. 4.

When detecting movement of the position of the contact from the position (1) to the position (2) as illustrated in FIG. 4(C) from a state illustrated in FIG. 4(B) while the pressure load satisfying the predetermined standard is detected, the input apparatus 1 provides the tactile sensation when the position of the contact reaches the position (2). Here, an upward pointing arrow at the position (2) indicates that the tactile sensation is provided at this point.

Thereafter, when repeatedly detecting the same contact operation, the input apparatus 1 repeats the same operation. More specifically, when detecting movement of the position of the contact from the position (2) to the position (3) as illustrated in FIG. 4(D) from a state illustrated in FIG. 4(C) while the pressure load satisfies the predetermined standard, the input apparatus 1 provides the tactile sensation at a point when the position of the contact reaches the position (3). In addition, when detecting movement of the position of the contact from the position (3) to the position (4) as illustrated in FIG. 4(E) from a state illustrated in FIG. 4(D) while the pressure load satisfies the predetermined standard, the input apparatus 1 provides the tactile sensation at a point when the position of the contact reaches the position (4).

Figure 5:
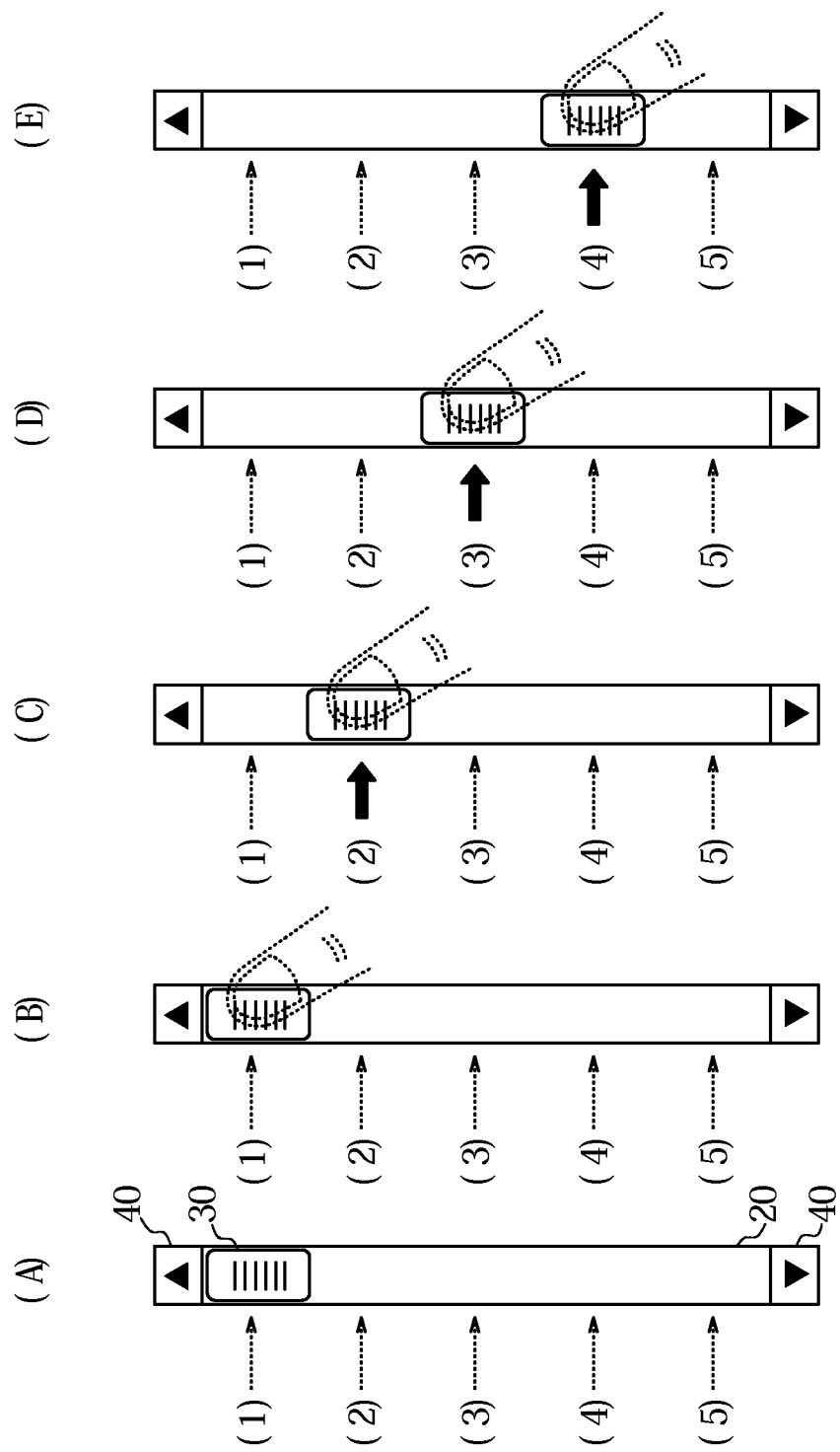
FIG. 5 schematically illustrates another example of the mode of the operation by the input apparatus according to the first embodiment.

FIG. 5 illustrates an example in which the input apparatus 1 according to the present embodiment employs the scroll bar. In FIG. 5(A), the knob 30 is displayed at an upper end of the slide bar 20 as the scroll bar. Since the slide bar 20 is the scroll bar, the operator can choose any position to shift the knob 30 in an analog method. After the operation, accordingly, the operator can stop the knob 30 at any position within a movable range in addition to positions (1)-(5) illustrated on the left side of the slide bar 20. In addition, the predetermined shift amount of the knob as the standard to provide the tactile sensation described above is set to be, for example, ⅓ of each interval between the positions (1)-(5) (for example, ⅓ of the interval between the position (1) and the position (2)).

The following is a case that, with such setting, the contact to the knob 30 of the slide bar 20 by the operator is detected as illustrated in FIG. 5(B). As described with reference to FIG. 4, in order to provide the realistic tactile sensation, the touch sensor 11 of the input apparatus 1 does not shift the knob 30 when detecting a light pressure load failing to satisfy the predetermined standard.

When detecting movement of the position of the contact from the position (1) to the position (2) as illustrated in FIG. 5(C) from a state illustrated in FIG. 5(B) while the pressure load satisfying the predetermined standard is detected, the input apparatus 1 provides the tactile sensation while the position of the contact is moving to the position (2). Here, since the predetermined amount of the shift of the knob as the standard to provide the tactile sensation is set to be ⅓ of each interval between the positions (1)-(5), the input apparatus 1 provides the tactile sensation each time the knob moves by ⅓ of the interval between the position (1) and the position (2). Accordingly, while the position of the contact moves from the position (1) to the position (2), the input apparatus 1 provides the tactile sensation three times in total. Here, the upward pointing arrow at the position (2) indicates that the tactile sensation is provided three times up to that point.

Thereafter, when repeatedly detecting the same contact operation, the input apparatus 1 repeats the same operation. More specifically, when detecting movement of the position of the contact from the position (2) to the position (3) as illustrated in FIG. 5(D) from a state illustrated in FIG. 5(C) while the pressure load satisfies the predetermined standard, the input apparatus 1 provides the tactile sensation three times while the position of the contact moves to the position (3). In addition, when detecting movement of the position of the contact from the position (3) to the position (4) as illustrated in FIG. 5(E) from a state illustrated in FIG. 5(D) while the pressure load satisfies the predetermined standard, the input apparatus 1 provides the tactile sensation three times while the position of the contact moves to the position (4).

It is to be understood that the predetermined amount of shift of the knob as the standard to provide the tactile sensation is set to be ⅓ of each interval between the positions (1)-(5) by way of example, and any predetermined amount can be set.

For example, in using the scroll bar not requiring minimal operations, it is possible to increase the predetermined amount set forth above and, in the same manner as illustrated in FIG. 4, to set the predetermined amount as the standard shift amount of the knob to provide the tactile sensation at each of the intervals between the positions (1)-(5). In this case, in the same manner as illustrated in FIG. 4, when detecting movement of the position of the contact to each of the positions (1)-(5) illustrated in FIG. 5, the input apparatus 1 provides the tactile sensation when the knob reaches each of the positions. In using the scroll bar requiring extremely minimal operations, it is possible to reduce the predetermined amount set forth above. For example, it is possible to set the predetermine amount as the standard shift amount of the knob to provide the tactile sensation to be 1/10 of each of the intervals between the positions (1)-(5) (for example, 1/10 of the interval between the position (1) and the position (2)). In this case illustrated in FIG. 5, while the position of the contact moves from the position (1) to the position (2), the input apparatus 1 provides the tactile sensation 10 times in total.

Next, the following is a description of an operation of the input apparatus 1 when deciding the shift amount of the knob based on the position of the contact on the slide bar elsewhere than the knob at step S17.

Figure 6:
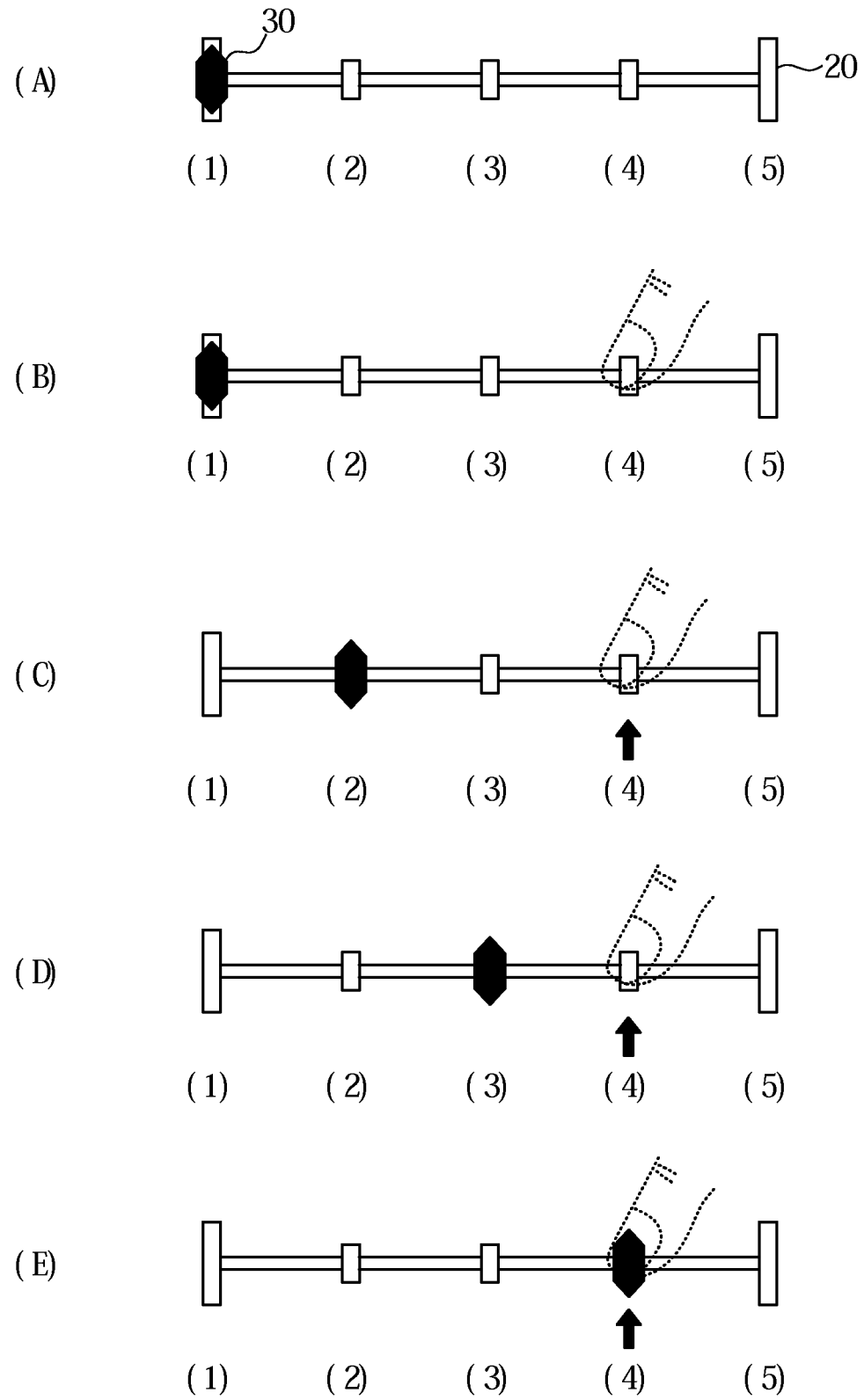
FIG. 6 schematically illustrates an example of the mode of the operation by the input apparatus according to the first and second embodiments.

FIG. 6 illustrates an example of the operation executed by the input apparatus 1 according to the present embodiment employing the track bar when a contact to a position on the slide bar elsewhere than the knob is detected. The symbols illustrated in FIG. 6 have the same meanings as those illustrated in FIG. 4. In FIG. 6(A), in the same manner as FIG. 4(A), the knob 30 is displayed at the left end of the slide bar 20 (position (1)) as the track bar displayed on the display unit 14 of the input apparatus 1.

The following is a case that, with such setting, the contact to a position (4) on the slide bar 20 elsewhere than the knob 30 by the operator is detected as illustrated in FIG. 6(B). FIG. 6(B) illustrates a state in which, for example, the operator is about to press the position (4) on the slide bar 20 where the knob 30 is not positioned. As described above, in order to provide the realistic tactile sensation, the touch sensor 11 of the input apparatus 1 does not shift the knob 30 when detecting a light pressure load failing to satisfy the predetermined standard.

FIG. 6(C) illustrates a state that the pressure load of the contact to the position (4) by the operator satisfies the predetermined standard. In this example, the input apparatus 1 is preset to gradually shift the knob 30 toward a position of the contact each time detecting the click operation at the position of the contact on the slide bar 20 elsewhere than the knob 30. Here, the click operation is a so-called "short pressing" to apply the pressure load satisfying the predetermined standard to the touch sensor 11 within a predetermined period. In this example, the shift amount of the knob 30 to gradually move towards the position of the contact is set to be, for example, each of the intervals between positions (1)-(5) (for example, the interval between the position (1) and the position (2)).

As illustrated in FIG. 6(C), accordingly, when the pressure load of the contact to the position (4) by the operator satisfies the predetermined standard, the input apparatus 1 shifts the knob 30 from the position (1) to the position (2). At this time, further, the input apparatus 1 provides the tactile sensation in accordance with the shift of the knob 30. Here, the upward pointing arrow at the position (4) in FIG. 6(C) indicates that the tactile sensation is provided at this point.

Thereafter, when repeatedly detecting the same contact operation, the input apparatus 1 repeats the same operation. That is, when detecting the click operation by the operator to contact the position (4) as illustrated in FIG. 6(D) applying the pressure load satisfying the predetermined standard, the input apparatus 1 shifts the knob 30 from the position (2) to the position (3). At this time, further, the input apparatus 1 provides the tactile sensation in accordance with the shift of the knob 30. As illustrated in FIG. 6E, in addition, when once again detecting the click operation by the operator to contact the position (4) applying the pressure load satisfying the predetermined standard, the input apparatus 1 shifts the knob 30 from the position (3) to the position (4). At this time also, the input apparatus 1 provides the tactile sensation in accordance with the shift of the knob 30.

It is also possible that the input apparatus 1 shifts the knob 30 and provides the tactile sensation each time after the predetermined period if the pressure load satisfying the predetermined standard is continuously detected at the position (4). That is, if the pressure load satisfying the predetermined standard is maintained at the position (4) as illustrated in FIG. 6(B), the input apparatus 1 can sequentially shift the knob 30 to the positions illustrated in FIGS. 6(C), (D) and (E) in the stated order each time after the predetermined period and provide the tactile sensation corresponding to each of the positions.

Figure 7:
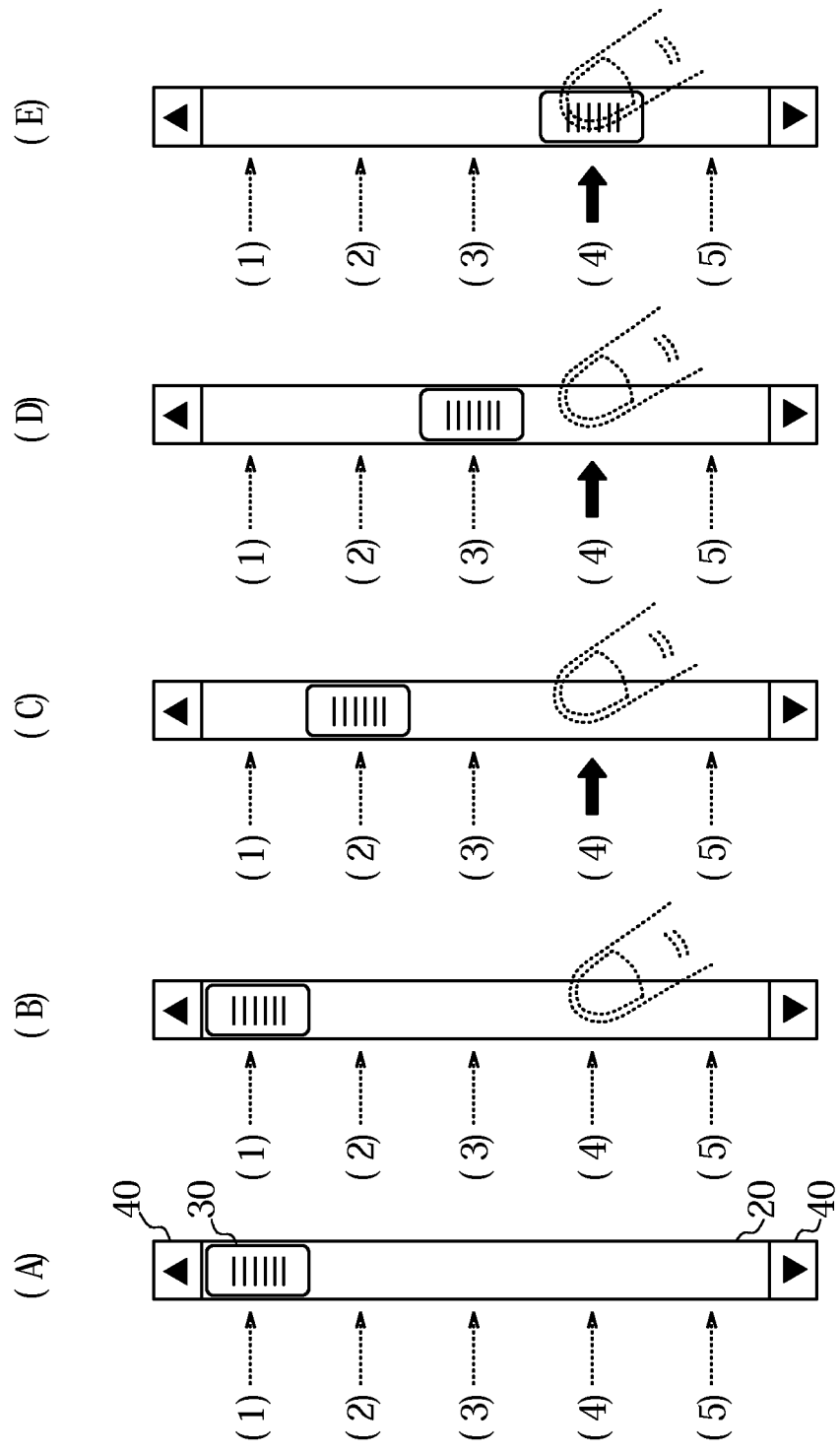
FIG. 7 schematically illustrates another example of the mode of the operation by the input apparatus according to the first and second embodiments.

FIG. 7 illustrates an example of an operation executed by the input apparatus 1 according to the present embodiment employing the scroll bar when a contact to a position on the slide bar elsewhere than the knob is detected. The symbols and the like illustrated in FIG. 7 have the same meanings as those illustrated in FIG. 5. In FIG. 7(A), in the same manner as FIG. 5(A), the knob 30 is displayed at the top of the slide bar 20 (position (1)) as the scroll bar displayed on the display unit 14 of the input apparatus 1.

The following is a case that, with such setting, the contact on the slide bar 20 elsewhere than the knob 30 by the operator is detected as illustrated in FIG. 7(B). FIG. 7(B) illustrates a state in which, for example, the operator is about to press a position (4) on the slide bar 20 where the knob 30 is not positioned. As described above, in order to provide the realistic tactile sensation, the touch sensor 11 of the input apparatus 1 does not shift the knob 30 when detecting a light pressure load failing to satisfy the predetermined standard.

FIG. 7(C) illustrates a state that the pressure load of the contact to the position (4) by the operator satisfies the predetermined standard. In this example also, the input apparatus 1 is preset to shift the knob 30 toward a position of the contact each time detecting the click operation at the position of the contact on the slide bar 20 elsewhere than the knob 30. In this example, the shift amount of the knob 30 to move towards the position of the contact is set to be, for example, ⅓ of each interval between positions (1)-(5) (for example, ⅓ of the interval between the position (1) and the position (2)).

As illustrated in FIG. 7(C), accordingly, when the pressure load of the contact to the position (4) by the operator satisfies the predetermined standard, the input apparatus 1 shifts the knob 30 from the position (1) to the position (2). In this example, when detecting three click operations with the pressure load of the contact by the operator satisfying the predetermined standard at the position (4), the input apparatus 1 shifts the knob 30 to the position (2) as illustrated in FIG. 7(C). In this case, every time detecting the click operation satisfying the predetermined standard, the input apparatus 1 shifts the knob 30 by ⅓ of the interval from the position (1) to the position (2). At this time, further, the input apparatus 1 provides the tactile sensation in accordance with the shift of the knob 30 by ⅓ of the interval from the position (1) to the position (2). That is, the input apparatus 1 provides the tactile sensation three times in total while the knob 30 is shifted from the position (1) to the position (2). Here, the upward pointing arrow at the position (4) in FIG. 7(C) indicates that the tactile sensation has been provided three times before this point.

Thereafter, when repeatedly detecting the same contact operation, the input apparatus 1 repeats the same operation. That is, when detecting the click operation by the operator to contact the position (4) as illustrated in FIG. 7(D) applying the pressure load satisfying the predetermined standard, the input apparatus 1 shifts the knob 30 by ⅓ of the interval from the position (2) to the position (3). That is, when detecting the click operation with the pressure load of the contact by the operator satisfying the predetermined standard three times in total at the position (4), the input apparatus 1 shifts the knob 30 to the position (3) as illustrated in FIG. 7(D). At this time, further, the input apparatus 1 provides the tactile sensation three times in total in accordance with the shift of the knob 30. In addition, when once again detecting the click operation with the pressure load of the contact by the operator satisfying the predetermined standard three times in total at the position (4), the input apparatus 1 shifts the knob 30 to the position (4) as illustrated in FIG. 7(E). At this time also, the input apparatus 1 provides the tactile sensation three times in total in accordance with the shift of the knob 30.

It is also possible that the input apparatus 1 shifts the knob 30 and provides the tactile sensation each time after the predetermined period if the pressure load satisfying the predetermined standard is continuously detected at the position (4). That is, if the pressure load satisfying the predetermined standard is maintained at the position (4) as illustrated in FIG. 7(B), the input apparatus 1 can sequentially shift the knob 30 to the positions illustrated in FIGS. 7(C), (D) and the (E) in the stated order each time after the predetermined period and provide the tactile sensation corresponding to each of the positions.

According to the present embodiment, as described above, it is possible to provide the tactile sensation just like the tactile sensation obtained when operating an actual slide bar such as a linear type slide controller, by detecting a contact to the slide bar by the touch sensor. For example, the input apparatus according to the present embodiment can provide a tactile sensation similar to that of the click operation when the knob is shifted by one scale on the slide bar. Therefore, according to the input apparatus of the present invention, it is possible to inform the operator of a state of the contact operation by providing the operator with a characteristic operation sensation appealing to the tactile sense. Accordingly, the input apparatus according to the present invention can further improve operability and also bring an effect to indirectly reduce erroneous operations. With the track bar, for example, even if the operator carries out the contact operation without intently looking at the display of the display unit 14, the operator can recognize whether the knob is shifted and the shift amount through the sensation. It thus enables reliable operations and reduction in erroneous operations.

With regard to the scroll bars illustrated in FIG. 5 and FIG. 7, the input apparatus 1 may shift the knob 30 and provide the tactile sensation in accordance with the shift as well, when detecting the click operation to an arrow 40, which is one of elements constituting the slide bar and functions to shift the knob. In FIG. 5(A), for example, when detecting the click operation with the pressure load satisfying the pressure load to the arrow 40 at the bottom of the slide bar 20, the input apparatus 1 shifts the knob 30 downward by the predetermined amount and displays it, as well as providing the tactile sensation in accordance with the shift. In FIG. 5(E), similarly, when detecting the click operation with the pressure load satisfying the pressure load to the arrow 40 at the top of the slide bar 20, the input apparatus 1 shifts the knob 30 upward by the predetermined amount and displays it, as well as providing the tactile sensation in accordance with the shift.

Second Embodiment

Next, an input apparatus according to a second embodiment of the present invention will be described. An input apparatus 2 according to the second embodiment may have the same constitution as that of the input apparatus 1 described in the first embodiment but partially alters the operation according to the first embodiment. Hence, the same descriptions as those of the first embodiment will be appropriately omitted.

The input apparatus 2 according to the second embodiment also operates based on the flowchart described with reference to FIG. 3. In addition, according to the second embodiment as well, the control unit 15 controls the tactile sensation providing unit 13 such that the tactile sensation is provided based on the position of the knob of the slide bar shifted in response to the contact detected by the touch sensor 11 while the load detection unit 15 is detecting the pressure load satisfying the predetermined standard. From this point of view, the input apparatus 2 according to the second embodiment performs in the same manner as the input apparatus 1 described in the first embodiment. However, the second embodiment has a different standard to provide the tactile sensation based on the display of the shift of the knob at step S16. That is, according to the second embodiment, the control unit 15 controls the tactile sensation providing unit 13 such that a different tactile sensation is provided to the object pressing the touch face of the touch sensor 11 based on the shift amount of the knob of the slide bar.

The following is a detailed description of a characteristic operation according to the second embodiment.

In the first embodiment described above, when, for example, the operator shifts the knob on the slide bar by a large amount at once while applying the pressure load satisfying the predetermined standard, the tactile sensation is continually generated, as the input apparatus 1 continually provides the tactile sensation every time the knob is shifted by the predetermined amount. In this case, when the knob is shifted by a large amount at once in a very short period, the input apparatus 1 may not be able to provide all of the tactile sensations to be provided every time the knob is shifted by the predetermined amount in the short period. In addition, even if all of the tactile sensations to provide every time the knob is shifted by the predetermined amount are provided, a case may occur such that the tactile sensation is still provided beyond the short period although the shift of the knob is already finished by the operator. When the tactile sensation is provided in this manner, it brings the feeling of strangeness to the operator.

According to the second embodiment, accordingly, when the knob is shifted over the predetermined amount in a predetermined short period, tactile sensations different from the usual tactile sensation are provided, instead of continually providing the same tactile sensations. According to the present embodiment, when detecting the shift of the knob over the predetermined amount in the predetermined short period, the input apparatus 2 provides, for example, a tactile sensation with a large (more intense) vibration or a higher frequency based on the shift amount of the knob. That is, the input apparatus 2 according to the present embodiment provides different tactile sensations based on the shift amounts of the knob.

For example, when detecting an operation to shift the knob 30 on the slide bar (track bar) 20 illustrated in FIG. 4 from the position in FIG. 4(B) to the position in FIG. 4(C) in the predetermined short period, the input apparatus 2 shifts the knob by the predetermined amount as the standard to provide the tactile sensation. Accordingly, the input apparatus 2 provides the tactile sensation at the position (C) in the same manner as the first embodiment. However, when detecting the shift of the knob 30 from the position in FIG. 4(B) to the position in FIG. 4(D) at once in the predetermined short period, the input apparatus 2 provides a tactile sensation different from that provided when the knob is shifted from the position in FIG. 4(B) to the position in FIG. 4(C) as described above. In this case, the tactile sensation provided at the position in FIG. 4(D) has a larger (more intense) vibration or a higher frequency than the tactile sensation provided when the knob is shifted from the position in FIG. 4(B) to the position in FIG. 4(C).

In addition, when detecting the shift of the knob 30 from the position in FIG. 4(B) to the position in FIG. 4(E) at once in the predetermined short period, the input apparatus 2 provides a tactile sensation different from that provided when the knob is shifted from the position in FIG. 4(B) to the position in FIG. 4(C) or the position in FIG. 4(D). In this case, the tactile sensation provided at the position in FIG. 4(E) has a larger (more intense) vibration or a higher frequency than the tactile sensation provided when the knob is shifted from the position in FIG. 4(B) to the position in FIG. 4(C) or the position in FIG. 4(D).

The input apparatus 2 performs the same operation for the slide bar (scroll bar) 20 illustrated in FIG. 5 as well. That is, when the knob 30 is shifted by a large amount at once in the predetermined short period, the input apparatus 2 provides a tactile sensation different from that provided when the knob is moved within the predetermined amount in the predetermined short period.

As another case to apply the operation of the input apparatus 2 according to the second embodiment, it is possible to assume an operation performed when the contact on the slide bar where the knob is not positioned is detected as described above.

The following is a description, with reference to FIG. 6, of an example of the operation executed when the input apparatus 2 according to the present embodiment detects a contact on the slide bar at a position where the knob is not positioned.

According to the first embodiment described above, when detecting the click operation with the pressure load satisfying the predetermined standard to a position on the slide bar 20 elsewhere than the knob 30, the input apparatus 1 gradually shifts the knob 30 towards the position each time detecting the contact to the position. However, the input apparatus 2 according to the second embodiment is preset to shift the knob 30 at once to the position of the contact when detecting the contact by the click operation with the pressure load satisfying the predetermined standard to the position on the slide bar 20 elsewhere than the knob 30. In the same manner as each of the embodiments described above, the touch sensor 11 of the input apparatus 2 does not shift the knob 30 when detecting a light pressure load failing to satisfy the predetermined standard.

In this example, when detecting the pressure load satisfying the predetermined standard at the position (4) in any of the states illustrated in FIGS. 6(B), (C) and (D), the input apparatus 2 shifts the knob 30 at once to the position (4) where the contact is detected as illustrated in FIG. 6(E). However, the input apparatus 2 provides a different tactile sensation when the knob 30 is shifted, based on which of the states illustrated in FIGS. 6(B), (C) and (D) the knob 30 was in before shifted.

For example, when the pressure load satisfying the predetermined standard is detected at the position (4) in the state illustrated in FIG. 6(D) and the knob 30 is shifted as illustrated in FIG. 6(E), the input apparatus 2 provides the tactile sensation described in the first embodiment.

On the other hand, when the pressure load satisfying the predetermined standard is detected at the position (4) in the state illustrated in FIG. 6(C) and the knob 30 is shifted as illustrated in FIG. 6(E), the input apparatus 2 provides the tactile sensation different from that described in the first embodiment. In this case, the input apparatus 2 provides the tactile sensation having, for example, a larger (more intense) vibration or a higher frequency than the tactile sensation provided when the knob 30 is shifted from the state illustrated in FIG. 6(D) to the position illustrated in FIG. 6(E).

In addition, when the pressure load satisfying the predetermined standard is detected at the position (4) in the state illustrated in FIG. 6(B) and the knob 30 is shifted as illustrated in FIG. 6(E), the input apparatus 2 provides the tactile sensation different from those described above. In this case, the input apparatus 2 provides the tactile sensation having, for example, a larger (more intense) vibration or a higher frequency than the tactile sensations provided when the knob 30 is shifted from the states illustrated in FIGS. 6(C) and (D) to the position illustrated in FIG. 6(E).

The input apparatus 2 performs the same operation also for the slide bar (scroll bar) 20 illustrated in FIG. 7.

That is, when the pressure load satisfying the predetermined standard is detected at the position (4) in a state illustrated in FIG. 7(D) and the knob 30 is shifted as illustrated in FIG. 7(E), the input apparatus 2 provides the tactile sensation described in the first embodiment. On the other hand, when the pressure load satisfying the predetermined standard is detected at the position (4) in a state illustrated in FIG. 7(C) and the knob 30 is shifted as illustrated in FIG. 7(E), the input apparatus 2 provides a tactile sensation different from that described in the first embodiment. In this case, the input apparatus 2 provides the tactile sensation having, for example, a larger (more intense) vibration or a higher frequency than the tactile sensation provided when the knob 30 is shifted from the state illustrated in FIG. 7(D) to the position illustrated in FIG. 7(E).

In addition, when the pressure load satisfying the predetermined standard is detection at the position (4) in a state illustrated in FIG. 7(B) and the knob 30 is shifted as illustrated in FIG. 7(E), the input apparatus 2 provides a tactile sensation different from those described above. In this case, the input apparatus 2 provides the tactile sensation having, for example, a larger (more intense) vibration or a higher frequency than the tactile sensations provided when the knob 30 is shifted from the states illustrated in FIGS. 7 (C) and (D) to the position illustrated in FIG. 7(E).

According to the second embodiment, as described above, the control unit 15 controls the tactile sensation providing unit 13 such that different tactile sensations are provided to the pressing object pressing the touch face of the touch sensor 11 based on the shift amount of the knob of the slide bar. Therefore, the input apparatus 2 according to the present embodiment informs the operator of a state of the contact operation by providing different tactile sensations based on the shift amount of the knob, which are characteristic operation sensations appealing to the tactile sense. Hence, the input apparatus 2 according to the present invention further improves operability.

In an example of variations of the present embodiment, the input apparatus, when detecting the pressure load satisfying the predetermined standard, may determine the shift amount of the knob based on the pressure load detected, instead of shifting the knob 30 at once to the position of the contact detected. For example, the input apparatus 2 shifts the knob 30 at once to the position of the contact detected when detecting a high pressure load, whereas the input apparatus 2 shifts the knob 30 halfway through the position of the contact detected when detecting a moderate pressure load. In this case, the input apparatus 2 determines the shift amount of the knob 30 based on the pressure load detected and provides different tactile sensations based on the shift amounts of the knob 30. For example, the input apparatus 2 may provide the tactile sensation with a larger (more intense) vibration or a higher frequency as the shift amount of the knob 30 at once to the position of the contact detected becomes larger.

Third Embodiment

Next, an input apparatus according to a third embodiment of the present invention will be described. An input apparatus 3 according to the third embodiment may have the same constitution as that of the input apparatus 1 described in the first embodiment and performs the operation according to the second embodiment in a partially altered manner. Hence, the same descriptions as those of the first and second embodiments will be appropriately omitted.

The input apparatus 3 according to the third embodiment also operates based on the flowchart described with reference to FIG. 3. In addition, according to the third embodiment as well, the control unit 15 controls the tactile sensation providing unit 13 such that the tactile sensation is provided based on the position of the knob of the slide bar shifted in response to the contact detected by the touch sensor 11 while the load detection unit 15 is detecting the pressure load satisfying the predetermined standard. From this point of view, the input apparatus 3 according to the third embodiment performs the same operation as the input apparatus 1 described in the first embodiment. However, the second embodiment has a different standard to provide the tactile sensation based on the display of the shift of the knob at step S16. According to the third embodiment, for example, the control unit 15 controls the tactile sensation providing unit 13 such that different tactile sensations are provided to the object pressing the touch face of the touch sensor 11 based on a position to which the knob is shifted.

The following is a detailed description of a characteristic operation according to the third embodiment.

Neither the first nor second embodiment described above mentions about to provide the tactile sensation based on the position to which the slide bar is shifted, regardless of the position to which the slide bar the knob is shifted. Hence, an input apparatus 3 according to the third embodiment changes the tactile sensation to provide based on the position on the slide bar to which the knob is shifted.

Figure 8:
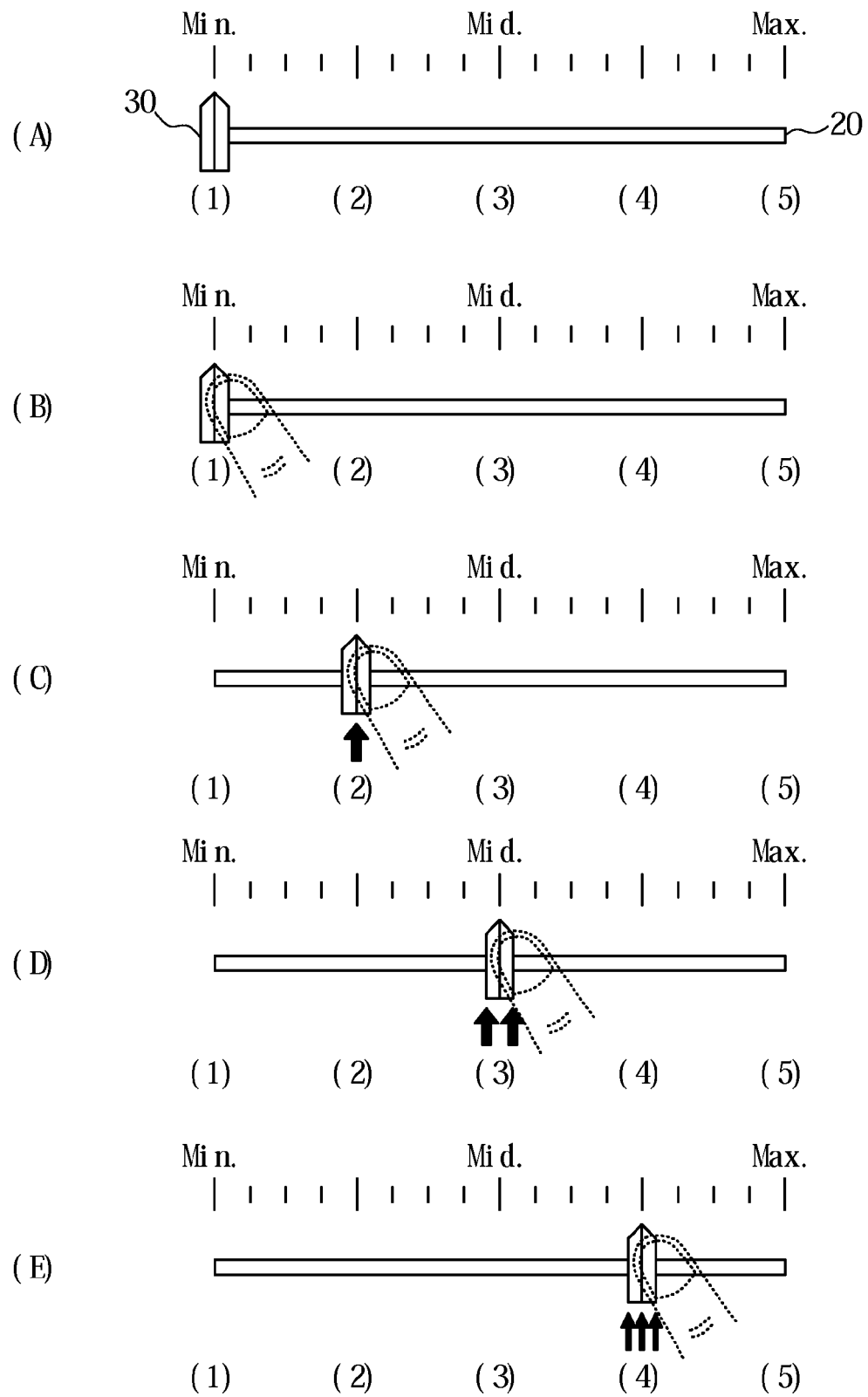
FIG. 8 schematically illustrates an example of a mode of an operation by the input apparatus according to a third embodiment.

FIG. 8 illustrates an operation of the input apparatus 3 according to the third embodiment. FIG. 8 illustrates an example in which the slide bar is employed for control of, for example, volume of audio equipment. As illustrated in FIG. 8(A), the knob 30 is displayed at the left end of the slide bar 20. It is to be noted that whether the slide bar is the track bar or the scroll bar is not an essential issue, and thus both of them are included.

As illustrated in FIG. 8, the input apparatus 3 operates to minimize (Min.) the volume in accordance with the shift of the knob 30 to the left end (1) of the slide bar 20 and to maximize (Max.) the volume in accordance with the shift of the knob 30 to a right end (5) of the slide bar 20. In addition, the input apparatus 3 operates to moderate (Mid.) the volume in accordance with the shift of the knob 30 to a middle position (3) of the slide bar 20. According to the present embodiment also, in order to provide the realistic tactile sensation, the touch sensor 11 of the input apparatus 3 does not shift the knob 30 when detecting a light pressure load failing to satisfy the predetermined standard.

The following is a case that, with such setting, the contact to the knob 30 of the slide bar 20 by the operator is detected as illustrated in FIG. 8(B). When detecting an operation to move the position of the contact from a position (1) to a position (2) as illustrated in FIG. 8(C) from a state illustrated in FIG. 8(B) while the pressure load satisfying the predetermined standard is detected, the input apparatus 3 provides the tactile sensation while the position of the contact moves to the position (2). Here, the upward pointing arrow at the position (2) indicates that the tactile sensation is provided while the position of the contact moves thereto. Since the position (2) is at a position corresponding to relatively small volume, the input apparatus 3 provides the tactile sensation having, for example, a small (weak) vibration or a low frequency vibration.

Thereafter, when repeatedly detecting the same contact operation, the input apparatus 3 repeatedly performs the same operation. For example, when detecting an operation to move the position of the contact from the position (2) to the position (3) as illustrated in FIG. 8(D) from a state illustrated in FIG. 8(C) while the pressure load satisfies the standard load, the input apparatus 3 provides the tactile sensation while the position of the contact moves to the position (3). Here, since the position (3) is at a position corresponding to medium volume, the input apparatus 3 provides the tactile sensation having, for example, a larger (more intense) vibration or a higher frequency vibration than the tactile sensation provided at the position (2). The upward pointing arrows at the position (3) in FIG. 8(D) indicate that such a tactile sensation is provided while the position of the contact moves thereto.

In addition, when detecting an operation to move the position of the contact from the position (3) to a position (4) as illustrated in FIG. 8(E) from a state illustrated in FIG. 8(D) while the pressure load satisfies the predetermined standard, the input apparatus 3 provides the tactile sensation while the position of the contact moves to the position (4). Here, since the position (4) is at a position corresponding to relatively large volume, the input apparatus 3 provides the tactile sensation having, for example, a larger (more intense) vibration or a higher frequency vibration than the tactile sensation provided at the position (3). The upward pointing arrows at the position (4) in FIG. 8(E) indicate that such a tactile sensation is provided while the position of the contact moves thereto.

According to the present embodiment, as described above, the input apparatus 3 provides different tactile sensations to the pressing object pressing the touch face of the touch sensor 11 based on the position of the slide bar to which the knob is shifted. Therefore, when the input apparatus 3 according to the third embodiment employs the slide bar to control volume of the audio equipment, for example, it enables sensory recognition of a volume state even when the audio equipment is muted. According to the input apparatus 3 of the present embodiment, accordingly, by providing the tactile sensation corresponding to the position to which the knob is shifted, it is possible to inform the operator of the state of the contact operation by the operator through a characteristic operation sensation appealing to the tactile sense. It is thus possible to reduce erroneous operations.

In the example according to the third embodiment described above, since it is assumed to use the slide bar to control volume of the audio equipment, the tactile sensation having a larger (more intense) vibration or a higher frequency vibration is provided when the position to which the knob of the slide bar is shifted corresponds to a larger volume. However, the present invention is not limited to the example illustrated in the third embodiment. It is also possible, by adopting the input apparatus 3 to a usage, to set the input apparatus 3 such that any different tactile sensation is provided based on a position to which the knob is shifted. For example, the input apparatus 3 may be set to provide the tactile sensations with different type of vibration, such as a rhythm and a timing, based on the position to which the knob is shifted, instead of providing the tactile sensation with different intensity of vibration.

It is to be understood that the present invention is not limited to the above embodiments but may be modified or varied in a multiple of manners. For example, although there is no mention about whether to generate a sound when the input apparatus performs the operation in each of the above embodiments, it is also possible to appropriately generate a sound in conjunction with the operation of the input apparatus in each of the above embodiments. Thereby, it is possible to further improve operability of the input apparatus and reduce erroneous inputs.

In each of the embodiments set forth above, the input apparatus provides the tactile sensation to the pressing object pressing the touch face based on the position of the knob of the slide bar. However, in using the scroll bar, for example, the shift of the knob and movement of the display of the contents scrolled in response to the operation to the scroll bar are usually in synchronization with each other. Accordingly, it may be considered to provide the tactile sensation based on a position of the contents displayed as scrolled, in addition to the position of the knob shifted. For example, in operating the scroll bar of the web page as illustrated in FIG. 9(B), it may be considered to provide the tactile sensation each time the contents are scrolled by three lines or by one page.

In addition, the load detection unit in each of the embodiments set forth above may be constituted by using any number of strain gauge sensors. Moreover, the load detection unit may be constituted according to a contact detection scheme of the touch sensor. For example, the load detection unit can be constituted without using the strain gauge sensor if the load can be detected from a change of an output signal based on a resistance change in accordance with a contact area in using the resistive film type. Alternatively, the load detection unit can be constituted without using the strain gauge sensor if the load can be detected from a change in an output signal based on a change in capacitance in using the capacitive type.

Moreover, the tactile sensation providing unit may be constituted by any number of piezoelectric transducers, transparent piezoelectric elements provided on an entire operation surface of the touch sensor or, if it is possible to vibrate such that the tactile sensation is provided, an eccentric motor which rotates 360 degrees in 1 cycle of the drive signal. Further, the load detection unit and the tactile sensation providing unit can share the piezoelectric elements if both units are constituted by using the piezoelectric elements.

According to the input apparatus of the present invention, the tactile sensation providing unit is driven when the pressure load detected by the load detection unit satisfies the standard to provide the tactile sensation. This "when the pressure load detected by the load detection unit satisfies the standard" may represent "when the pressure load detected by the load detection unit reaches a standard value to provide the tactile sensation", "when the pressure load detected by the load detection unit exceeds the standard value to provide the tactile sensation", or "when the standard value to provide the tactile sensation is detected by the load detection unit".

REFERENCE SIGNS LIST 11 touch sensor
11a touch face
11a load detection unit
12 tactile sensation providing unit
13 display unit
15 control unit
20 slide bar
21 housing
22 insulator
23 upper cover
24 insulator
30 knob
31 strain gauge sensor
32 piezoelectric vibrator
40 arrow

The invention claimed is:

1. An input apparatus, comprising:
a touch sensor configured to detect a contact;
a load detection unit configured to detect a pressure load on a touch face of the touch sensor;
a display unit configured to display a slide bar;
a tactile sensation providing unit configured to vibrate the touch face; and
a control unit configured to control the tactile sensation providing unit such that a tactile sensation is provided to an object pressing the touch face based on a position of a knob of the slide bar shifted in response to the contact detected by the touch sensor while the pressure load detected by the load detection unit satisfies a predetermined standard, wherein
the control unit controls the tactile sensation providing unit such that a different tactile sensation is provided to the object pressing the touch face based on a shift amount of the knob, when the knob is shifted over a predetermined amount in a predetermined period of time.

2. An input apparatus, comprising:
a touch sensor configured to detect a contact;
a load detection unit configured to detect a pressure load on a touch face of the touch sensor;
a display unit configured to display a slide bar;
a tactile sensation providing unit configured to vibrate the touch face; and
a control unit configured to control the tactile sensation providing unit such that a tactile sensation is provided to an object pressing the touch face based on a position of a knob of the slide bar shifted in response to the contact detected by the touch sensor while the pressure load detected by the load detection unit satisfies a predetermined standard, wherein
the control unit controls the tactile sensation providing unit such that a different tactile sensation is provided to the object pressing the touch face based on a shift amount of the knob, wherein the control unit determines the shift amount of the knob based on the pressure load detected when detecting the pressure load satisfying the predetermined standard.

* * * * *